United States Patent Office

3,119,701
DRIED BANANA AND PROCESS OF PREPARING THE SAME
Robert C. Gunther, Galesburg, Ill., assignor to Gunther Products, Inc., Galesburg, Ill., a corporation of Illinois
No Drawing. Filed Aug. 29, 1960, Ser. No. 52,371
4 Claims. (Cl. 99—204)

This invention, in general, relates to a process for aerating and stabilizing foams of banana, to stable banana foam compositions and to dried banana products derived therefrom. The invention is concerned especially with the preparation of dried banana, which can be easily reconstituted by the addition of water, in processes utilizing the foam-mat drying process.

Many different methods are known and various methods have been attempted over the years for the purpose of providing dried food products which can be reconstituted with water and which, when so reconstituted, will have a pleasing taste and flavor similar to the taste and flavor of the original product. It has long been recognized that it would be desirable to prepare such products but many of the methods that have been used leave much to be desired for one or more reasons. Among the methods that have been used are, for example, freeze drying and vacuum drying. One of the primary objections to these methods lies in the relatively expensive equipment required. Furthermore, they are limited in their application to relatively small number of food products.

Another method which has been developed is the method of Morgan et al. which is described in an article entitled "Technique for Improving Instants," Food Engineering, 31 (9), 86. This method is called "foam-mat" drying and the process consists essentially of three steps, namely: (1) formation of a stable foam containing the product to be dried, (2) air drying of the foam to form a thin porous sheet or mat, and (3) compression of the dried mat followed by disintegration to yield a free-flowing powder.

The first step is accomplished by whipping the desired product with a whipping agent and a suitable stabilizer in a conventional food beater. The foam density and initial bulk density of the product can be carefully controlled by proper balance of the stabilizer, whipping agent and whipping time. The second step is normally carried out by metering the stabilized foam onto a continuous belt which runs through drying ovens maintained at predetermined temperatures. Drying times have run as long as one hour and temperatures have ranged from 130° F. to 190° F. The third step involves removal of the dried foam mat intact from the continuous belt, compression to a high bulk density product and then disintegration to the desired powdered or other disintegrated form.

The foam-mat drying process is a very simple and inexpensive process. One difficulty that has heretofore been experienced with this process, however, is the lack of stability of the foam during the heating cycle. If the foam does not remain stable, cellular breakdown occurs causing serious impairment of the drying operation.

One of the objects of the present invention is to provide a new and improved process for producing heat stable foams from mashed banana compositions.

Another object of the invention is to provide new and improved stable foams of mashed banana compositions.

Still another object of the invention is to provide a new and improved foam-mat drying process especially useful in the preparation of dried banana products.

Another object of the invention is to provide new and useful dried banana products which are easily reconstituted with water to provide dehydrated products having the banana flavor of the original product.

These and other objects of the invention are accomplished by using in the foam-mat drying process a composition of mashed bananas and a water-soluble cellulose lower alkyl ether or a water-soluble cellulose lower hydroxyalkyl ether, or a water-soluble cellulose in which the hydroxy groups of the cellulose are etherified with both lower alkyl and lower hydroxyalkyl groups. Examples of suitable alkyl groups which may be present in the preparation of the water-soluble cellulose ethers are methyl, ethyl, hydroxyethyl, and/or hydroxypropyl groups. One specific example of a suitable water-soluble cellulose ether is the water-soluble cellulose methylether known as "Methocel" which is essentially the dimethylether of cellulose.

Methocel MC is made by etherifying purified cotton or wood cellulose by reacting an alkali cellulose with methyl chloride. Other specific cellulose ethers which are suitable for the practice of the invention are Methocel-60 HG, Methocel-65 HG, Methocel-70 HG, and Methocel-90 HG. The dimethylether of cellulose is sold under the trade name "Methocel MC" and the USP grade contains 27.5% to 31.5% methoxyl. The technical grade contains 26% to 33% methoxyl. The Methocel 60-HG contains 28% to 30% methoxyl and 7% to 12% hydroxypropoxyl. The Methocel-65 HG contains 27% to 29% methoxyl and 4.0% to 7.5% hydroxypropoxyl. The Methocel-70 HG contains 24% to 27% methoxyl and 3.0% to 5.5% hydroxypropoxyl. The Methocel-90 HG contains 19% to 24% methoxyl and 4% to 12% hydroxypropoxyl. The Methocel HG family contains about 3–12% hydroxypropoxyl groups and about 19–30% methoxyl groups. These products are prepared in the form of powders and disperse in water to yield aqueous dispersions of various viscosities. They are also prepared in the form of aqueous dispersions in a broad range of viscosities from 10 to 8000 centipoises (2% aqueous dispersions at 20° C.).

The water-soluble cellulose ethers which are effective for the purpose of the invention are all characterized by the fact that they form fluid solutions at room temperature, the viscosity of which decreases when the solutions are heated until the gelation temperature is reached. This reversible gelation at a certain temperature is referred to as thermal gelation.

The thermal gelation properties of the water-soluble cellulose ethers employed in the practice of the invention is in marked contrast to the behavior of well-known hydrophilic colloids, such as gelatin which tend to gel on cooling and become fluid with heat. For example, if gelatin is used as a stabilizer in a foam system it can very well form a stable foam at room temperature since gelatin will gel when cooled but when such a foam is heated to 150° F. to 160° F., as is done in the foam drying process, gelatin loses its stabilizing properties because it becomes fluid under the influence of heat and the foam stability is lost.

Especially good results have been obtained in the practice of the invention by employing either the dimethylether derivatives of cellulose (Methocel MC) or an alkyl ether of cellulose which contains both methoxyl substitution and hydroxypropoxyl substitution in the cellulose chain (Methocel HG). As previously indicated, these cellulose derivatives are available in a wide variety of types and viscosities. All may be used in the practice of this invention under the right conditions and proper application because the predetermining factor in their use is the thermal gelation property. The concentration of the cellulose ether based on the banana solids (dry basis) is sufficient to give a firm foam texture which is stable at about 160° F. The viscosity of the banana mix is also a factor to be considered, and cellulose ether concentrations are to be avoided which increase the viscosity of the mix to a point in which insufficient aeration is obtained in the foam-forming process because of poor beating properties. The minimum quantity of the cellulose ether, based on the banana solids (dry basis), should be about 0.2% by weight in order to obtain a substantially firm foam texture. The maximum quantity is governed primarily by the increase in the viscosity of the banana mix to a point where insufficient aeration is obtained and ordinarily will not exceed 3% by weight on the same basis. The optimum quantity of the best cellulose ethers, such as the dimethyl ether of cellulose, is in the range of 0.4–1.5% by weight when considering both the quality of the foam texture and the foam density of the foamed mashed banana product.

It should be pointed out that the mashed bananas to be used in foam-mat drying should always be heat treated in absence of air to deactivate the many enzymes (amylase, sucrase, protease, lipase, raffinase and peroxidase) that are present in the banana. If the bananas are not so treated, darkening of the banana will occur during the foaming and drying stage. Commercially available mashed bananas are normally heat treated prior to canning, making further treatment unnecessary when this type is used in the invention.

The foam density of the mashed banana product is a measure of the degree of aeration. A highly aerated product is desired because it produces a foam which dries more rapidly than lesser aerated foams and also yields a dried product which is more easily disintegrated into a free flowing powder. For the best practice of this invention, the amount of the water-soluble ether of cellulose should produce a foam having a density less than 0.8 gram per cubic centimeter, and usually within the range of 0.20 to 0.80 gram per cubic centimeter.

It is a discovery of this invention that the water-soluble cellulose ethers herein described are outstanding agents in the production of foams of mashed banana compositions, which mashed banana foams are particularly well adapted for drying in the foam-mat drying process. In the study of a large number of various gums and thickeners, these ethers of cellulose were the only ones to exhibit the dual phenomena of aerating the banana mix to the proper degree and producing a foam which is stable at drying temperatures in the order of 130–190° F., preferably about 160° F.±10° F.

Table A is a presentation of the whip results and storage results of a series of banana foams produced using various gums and thickeners. These tests were conducted using only the gum or thickeners and the mashed bananas with no other whipping agent present. The water-soluble ether cellulose, in this instance Methocel-65 HG, not only is the only material showing significant whipping properties, but also is the only material producing a stable foam at the drying temperature. The procedure in each test was the same. A mixture of 300 grams of mashed bananas (22% solids) and 0.5 gram of gum or thickener (20 grams of 2.5% solutions) was whipped at 25° C. in a Hobart Kitchen Aid beater (model K5A) for four minutes with a wire wisk. The density was measured immediately, and small foam samples were stored at 160° F. The time to break was the time elapsed prior to actual liquid drainage.

TABLE A

| Gum or Thickener | Foam Density (g./cc.) | Foam Texture | Stability at 160° F. (Time to break) |
| --- | --- | --- | --- |
| None | 0.980 | fluid | approximately 30 sec. |
| Locust Bean | 0.990 | ---do--- | Do. |
| Guar Gum | 0.942 | ---do--- | Do. |
| Kelcoloid HVF [1] | 0.990 | ---do--- | Do. |
| Agar-Agar | 1.01 | ---do--- | Do. |
| Carboxy Methyl Cellulose | 1.00 | ---do--- | Do. |
| Methocel-65 HG (4,000 cps.) | 0.300 | very firm | no break. |

[1] Propylene glycol ester of alginic acid.

The performance of various water-soluble cellulose ethers contemplated by the invention in aerating and producing stable foams of banana was measured by whipping 300 grams of mashed bananas (22% solids) and 0.6 gram of the various types of Methocel reported in Table B, below. The remainder of the test procedure was the same as that described above with respect to the tests reported in Table A.

TABLE B

| Methocel | Foam Density (g./cc.) | Foam Texture | Stability at 160° F. |
| --- | --- | --- | --- |
| 60 HG (4,000 cps.) | 0.286 | very firm | no break. |
| 65 HG (4,000 cps.) | 0.290 | ---do--- | Do. |
| 65 HG (400 cps.) | 0.290 | ---do--- | Do. |
| 70 HG (4,000 cps.) | 0.333 | firm | Do. |
| 90 HG (4,000 cps.) | 0.380 | weak | softened but no break. |
| 90 HG (400 cps.) | 0.410 | weak-firm | Do. |
| MC (4,000 cps.) | 0.276 | very firm | no break. |

The results of the foregoing tests indicate that the viscosity of the cellulose ether apparently has little to do with the whipping properties. The members of the Methocel family in Table B are five different types of cellulose ethers ranging from Methocel MC, which is essentially the dimethyl ether of cellulose to the Methocel HG types which have varying degrees of hydroxypropoxyl to methoxyl substitution with increasing solution gel point temperature. It appears that the higher the gelation point, which varies inversely to the methoxyl content in the molecule, the less are the aerating properties of the cellulose ether. This is demonstrated by the fact that Methocel MC (4,000 cps.), the cellulose ether with the lowest gelation temperature, produced foam density of 0.276 g./cc., whereas Methocel-90 HG (4,000 cps.), the material with the highest gelation temperature, produced a foam density of 0.380.

A further series of tests were performed to ascertain the effect of concentration of the cellulose ether on foam density and foam stability. In these tests, the concentration of Methocel-65 HG (4,000 cps.) was varied from 0.15% to 2.0%, based on the total dry solids in the banana. The test procedure was the same as that previously described, the amount of mashed banana used being 300 grams with 22% solids. The results of these tests are reported in Table C.

TABLE C

| Amount Methocel | | Foam Density (g./cc.) | Foam Texture | Stability at 160° F. (minutes to break) |
| --- | --- | --- | --- | --- |
| Grams | Percent on banana solids | | | |
| 0 | 0 | 0.980 | weak | 1. |
| 0.1 | 0.15 | 0.785 | ---do--- | 3. |
| 0.2 | 0.30 | 0.588 | weak-firm | Softened but no break. |
| .4 | 0.60 | 0.365 | firm | no break. |
| 0.6 | 0.90 | 0.290 | very firm | Do. |
| 0.8 | 1.2 | 0.275 | ---do--- | Do. |
| 1.2 | 2.0 | 0.308 | firm | Do. |

The foregoing illustrative tests show the capability of the water-soluble ethers of the present invention in aerating and producing stable foams of mashed bananas. The following examples illustrate the practice of the invention in producing a dried banana product by the foam-mat drying process.

*Example I*

To 300 parts of mashed bananas was added 0.6 part of Methocel-65 HG (4000 cps.) in the form of a 4% solution, a total of 15 grams of solution. The mixture was stirred for a short period to disperse the Methocel, after which it was whipped for 4 minutes with a wire wisk and a light, very firm foam weighing 0.29 g./cc. was produced.

This foam was spread to approximately 3/8 inch thickness on a Teflon coated glass fiber mat and dried in an oven at 160–170° F. Drying time was 2–3 hours. The dry mat was very light in color and showed no sign of weep or breakdown. It could be easily crushed and the powder, when reconstituted with water, gave a mashed banana mix practically identical in color, odor and taste to the original material.

*Example II*

To 300 g. of mashed bananas (prepared by blending ripe, whole bananas in a Waring Blendor and rapidly heating to 160° F. for 5 minutes in the absence of air then chilling immediately to room temperature) was added 0.4 g. Methocel MC (4000 cps.) (10 g. of 4% solution). After mixing well, the mix was whipped for 4 minutes in a Hobart Kitchen Aid beater. A very firm, light colored fluff was obtained which weighed 0.27 g./cc. The whipped foam was spread to 1/4 in. thickness on a Teflon coated fiber glass mat and dried in the oven at 170° F. for 2½ hours. A fine-celled, light colored mat was produced which could be easily crushed to a fine powder. When reconstituted with water, the material was nearly identical to the original banana mix.

*Example III*

The procedure of Example II is reported with the substitution of Methocel-60 HG (4000 cps.) for Methocel MC.

The invention herein described is highly useful in the production of banana foams which are stable at ordinary foam-mat drying temperatures and which are well aerated, as evidenced by their relatively low density. Additional or other auxiliary whipping agents are not required to produce a satisfactory foam. These aerated banana foams are especially suited for producing dried banana products by the foam-mat drying process. The dried banana products, upon reconstitution with water, have a flavor, color and aroma substantially identical with the original banana product.

The invention is hereby claimed as follows:

1. A process of producing a dried banana product which can be reconstituted with water comprising intimately mixing with mashed bananas 0.2% to 3% by weight of dried banana solids of a nontoxic, edible, water-soluble ether of cellulose from the group consisting of water-soluble lower alkyl ethers of cellulose, water-soluble lower hydroxy alkyl ethers of cellulose and water-soluble ethers of cellulose containing both lower alkyl groups and lower hydroxy alkyl groups, whipping the resultant mix to produce a stable foam, forming said foam into a porous mat, and drying said mat, the proportion of said water soluble ether of cellulose being sufficient to stabilize said foam at 160° F. and to form a foam having a density less than 0.80 gram per cubic centimeter.

2. A process of producing a dried banana product which can be reconstituted with water comprising intimately mixing with mashed bananas 0.2% to 3% by weight of dried banana solids of a nontoxic, edible, water-soluble ether of cellulose from the group consisting of water-soluble lower alkyl ethers of cellulose, water-soluble lower hydroxy alkyl ethers of cellulose and water-soluble ethers of cellulose containing both lower alkyl groups and lower hydroxy alkyl groups, whipping the resultant mix to produce a stable foam, forming said foam into a porous mat, and drying said mat, the proportion of said water-soluble ether of cellulose being sufficient to stabilize said foam at 160° F. and to form a foam having a density within the range of 0.20 to 0.80 gram per cubic centimeter.

3. A process of producing a dried banana product which can be reconstituted with water comprising intimately mixing with mashed bananas 0.2% to 3% by weight of dry banana solids of the dimethyl ether of cellulose, whipping the resultant mix to produce a stable foam, forming said foam into a porous mat, and drying said mat, the proportion of said water soluble ether of cellulose being sufficient to stabilize said foam at 160° F. and to form a foam having a density less than 0.80 gram per cubic centimeter.

4. A process of producing a dried banana product which can be reconstituted with water comprising intimately mixing with mashed bananas 0.2% to 3% by weight of dry banana solids of a water-soluble ether of cellulose in which the ether groups are both methoxyl and hydroxypropoxyl, whipping the resultant mix to produce a stable foam, forming said foam into a porous mat, and drying said mat, the proportion of said water soluble ether of cellulose being sufficient to stabilize said foam at 160° F. and to form a foam having a density less than 0.80 gram per cubic centimeter.

References Cited in the file of this patent

UNITED STATES PATENTS

| | | |
|---|---|---|
| 2,592,332 | Reale | Apr. 8, 1952 |
| 2,955,046 | Morgan | Oct. 4, 1960 |